(12) United States Patent
Hollender et al.

(10) Patent No.: US 9,311,800 B2
(45) Date of Patent: Apr. 12, 2016

(54) SAFETY DEVICE FOR A TECHNICAL INSTALLATION OR A TECHNICAL PROCESS

(71) Applicant: ABB Technology AG, Zurich (CH)

(72) Inventors: Martin Hollender, Dossenheim (DE); Tony B. Atkinson, Loftus Saltburn (GB)

(73) Assignee: ABB TECHNOLOGY AG, Zurich (CH)

(*) Notice: Subject to any disclaimer, the term of this patent is extended or adjusted under 35 U.S.C. 154(b) by 0 days.

(21) Appl. No.: 14/027,813

(22) Filed: Sep. 16, 2013

(65) Prior Publication Data
US 2014/0077955 A1 Mar. 20, 2014

(30) Foreign Application Priority Data

Sep. 15, 2012 (EP) .................................. 12006490

(51) Int. Cl.
*G08B 23/00* (2006.01)
*G08B 21/02* (2006.01)
(Continued)

(52) U.S. Cl.
CPC ................ *G08B 21/02* (2013.01); *G06Q 10/00* (2013.01); *G08B 21/06* (2013.01)

(58) Field of Classification Search
CPC ............... G08B 21/06; G08B 21/0446; G08B 21/0208; G08B 21/22; G08B 21/024; G08B 21/0476; G08B 21/043; A61B 5/18; A61B 5/02055; A61B 5/1118; A61B 2503/22; A61B 5/1103; A61B 5/1128; A61G 9/00597; A61M 2021/0094
USPC ......... 340/573.1, 575, 576; 348/143, 148, 77, 348/78; 701/1, 49; 180/272
See application file for complete search history.

(56) References Cited

U.S. PATENT DOCUMENTS 5,813,993 A * 9/1998 Kaplan et al. ................. 600/544
5,942,979 A 8/1999 Luppino
(Continued)

FOREIGN PATENT DOCUMENTS

DE 201 19 203 U1 2/2002
DE 10 2005 015 486 A1 10/2006
(Continued)

OTHER PUBLICATIONS

Search Report mailed on Mar. 1, 2013, by the European Patent Office for Application No. 12006490.2.

*Primary Examiner* — Travis Hunnings
(74) *Attorney, Agent, or Firm* — Buchanan Ingersoll & Rooney PC

(57) ABSTRACT

The disclosure relates to a safety device and a method for detecting and evaluating the degree of attention of an operator of a technical installation or a technical process, which includes a first module which records values of predefined physiological parameters of the operator and determines a first characteristic number from the recorded values, compares the determined first characteristic number with a predefined first characteristic value, which activates a second module which records further values provided by a checking or triggering mechanism. The second module determines a second characteristic number for the degree of attention of the operator from the recorded further values, compares the second characteristic number with at least one second predefined characteristic value, which triggers an activation module in order to take countermeasures which increase the attention of the operator of the installation.

20 Claims, 1 Drawing Sheet

(51) Int. Cl.
  *G06Q 10/00* (2012.01)
  *G08B 21/06* (2006.01)

(56) References Cited

U.S. PATENT DOCUMENTS

| | | | |
|---|---|---|---|
| 6,060,989 A | 5/2000 | Gehlot | |
| 6,236,968 B1* | 5/2001 | Kanevsky et al. | 704/275 |
| 6,849,050 B1* | 2/2005 | Russo et al. | 600/558 |
| 6,927,694 B1* | 8/2005 | Smith et al. | 340/576 |
| 7,027,621 B1* | 4/2006 | Prokoski | 382/118 |
| 7,692,551 B2* | 4/2010 | Bonefas et al. | 340/575 |
| 8,009,051 B2* | 8/2011 | Omi | 340/575 |
| 8,576,081 B2* | 11/2013 | Hatakeyama et al. | 340/575 |
| 2003/0151516 A1* | 8/2003 | Basir et al. | 340/575 |
| 2005/0024212 A1 | 2/2005 | Hultzsch | |
| 2010/0245093 A1* | 9/2010 | Kobetski et al. | 340/576 |
| 2012/0112879 A1* | 5/2012 | Ekchian et al. | 340/5.53 |
| 2012/0166047 A1* | 6/2012 | Khanafer et al. | 701/48 |
| 2012/0169503 A1* | 7/2012 | Wu et al. | 340/575 |

FOREIGN PATENT DOCUMENTS

| | | |
|---|---|---|
| WO | WO 03/049967 A1 | 6/2003 |
| WO | WO 2011/117061 A1 | 9/2011 |

* cited by examiner

SAFETY DEVICE FOR A TECHNICAL INSTALLATION OR A TECHNICAL PROCESS

RELATED APPLICATION(S)

This application claims priority under 35 U.S.C. §119 to European Patent Application No. 12006490.2 filed in Europe on Sep. 15, 2012, the entire content of which is hereby incorporated herein by reference in its entirety.

FIELD

The disclosure relates to a safety device for detecting and evaluating the degree of attention of an operator of a technical installation or a technical process, which device can be integrated in an operating and monitoring system of the technical installation or the technical process, the operating and monitoring system being used, for example, in a control room or control system of a large-scale technical installation, an oil and gas platform, a refinery or a power station installation. The disclosure also relates to a method for detecting and evaluating the degree of attention of the operator of a technical installation or a technical process.

BACKGROUND INFORMATION

The operation of operating and monitoring systems can be more complex in safety-critical large-scale technical installations, with the operators of the installations carrying out tasks which can take up their full attention.

WO 2011/117061 describes a method for monitoring the state of attention of an operator of a production device, which method is used to reduce losses of quality during production but also to reduce damage to production devices and even risks to the health and life of the employees in the event of decreasing concentration as a result of overtiredness or overloading of the employee. In this case, operating or response times of the operator of the installation are determined for repeated operating processes from signals from sensors and operating elements of the production installation in a provided evaluation unit and are statistically evaluated, and reactions are initiated in the case of deviations from the norm.

Detecting and monitoring the degree of attention, for example in motor vehicles, are known, for example, from DE 102005015486 A1 and DE 201 19 203 U1.

In operating and monitoring systems of large-scale technical installations which are operated continuously, signs of fatigue of the operators cannot be excluded, for example, during a night shift, which can result in safety-critical events inside the installation.

The disclosure is based on a safety device and a method for detecting and evaluating the degree of attention of the operator of a technical installation or a technical process, and the operation and monitoring, for example, of a large-scale technical installation or a large-scale technical process.

SUMMARY

A safety device for detecting and evaluating the degree of attention of an operator of a technical installation or a technical process is disclosed, the safety device comprising: a first module configured to: record values of predefined physiological parameters of the operator and determine a first characteristic number from the recorded values; and compare the determined first characteristic number with a predefined first characteristic value and, if the first characteristic value is exceeded and/or undershot or if a predefined first range of characteristic values is left, activates a second module; and wherein the second module is configured to: record further values provided by a checking or triggering mechanism; determine a second characteristic number for the degree of attention of the operator from the recorded further values; and compare the second characteristic number with at least one second predefined characteristic value and, if the second characteristic value is exceeded and/or undershot or if a predefined second range of characteristic values is left, triggers an activation module for taking countermeasures which increases the attention of the operator of the installation.

A method is also disclosed for a technical installation or a technical process using a device for detecting and evaluating the degree of attention of an operator of the installation or the process, the method comprising: recording values of predefined physiological parameters of the operator using a first module; determining a first characteristic number from the recorded values; comparing the determined first characteristic number with a predefined first characteristic value and, if the first characteristic value is exceeded and/or undershot or if a predefined first range of characteristic values is left, activating a second module to record further values provided by a checking or triggering mechanism; determining a second characteristic number for the degree of attention of the operator from the recorded further values using the second module; and comparing the second characteristic number with at least one second predefined characteristic value and, if the second characteristic value is exceeded and/or undershot or if a predefined second range of characteristic values is left, triggering an activation module for taking countermeasures which increase the attention of the operator of the installation.

BRIEF DESCRIPTION OF THE DRAWINGS

The disclosure is explained below with reference to exemplary embodiments shown in the drawings. In the drawings.

DETAILED DESCRIPTION

Figure 1:
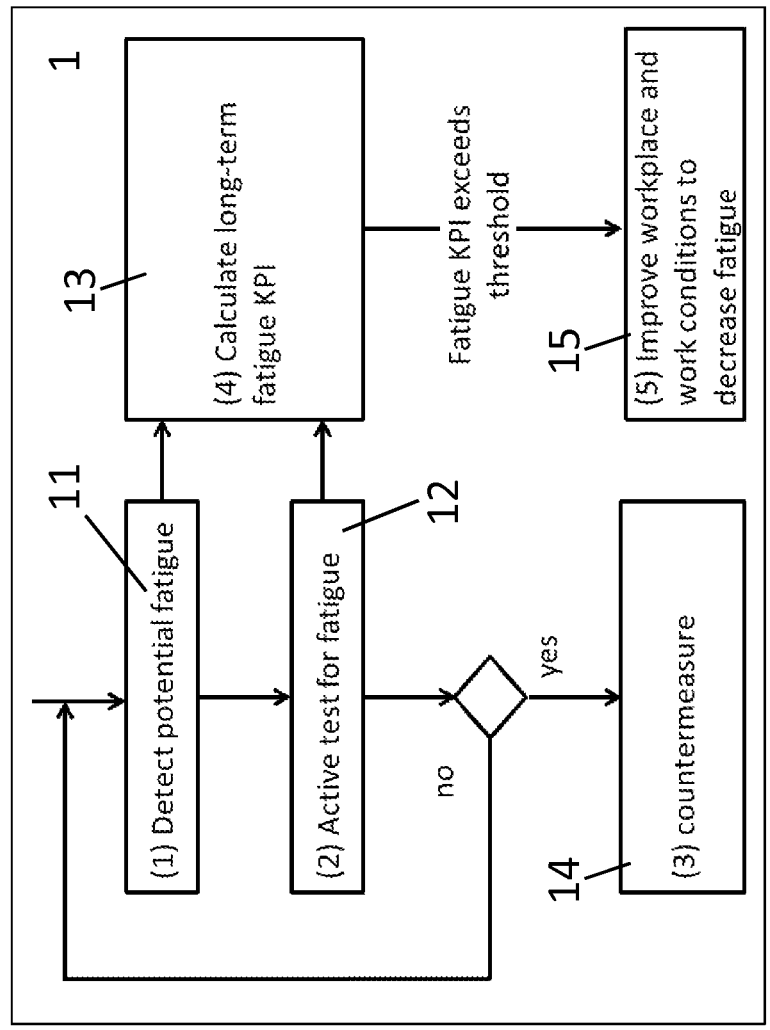
FIG. 1 shows an exemplary safety device for detecting and evaluating the degree of attention of an operator of a technical installation using a passive module, which detects body reactions of an operator of the installation and uses them to generate values relating to the degree of attention of the operator and transmits said values to a processing and evaluation unit.

An exemplary safety device according to the disclosure for detecting and evaluating the degree of attention of an operator of a technical installation or a technical process includes a first module which records values of predefined physiological parameters of the operator relating to the degree of attention of the operator. The first module can be provided for detecting body reactions of the operator, for example, using at least one sensor.

The first module determines a first characteristic number from the recorded values, compares the determined first characteristic number with a predefined characteristic value and, if the characteristic value is exceeded and/or undershot or if a predefined range of characteristic values is left, activates a second module.

The second module records further values provided by a checking or triggering mechanism. In accordance with an exemplary embodiment, the checking or triggering mechanism integrated in the second module can also use values relating to the body reactions of the operator which are detected by the first module.

The second module determines a second characteristic number for the degree of attention of the operator from the recorded further values, compares the determined second characteristic number with at least one second predefined characteristic value and, if the second characteristic value is exceeded and/or undershot or if a predefined second range of characteristic values is left, triggers an activation module in order to take countermeasures which can increase the attention of the operator of the installation.

For example, the second module determines the characteristic numbers from the number of phases in which no registered movement of the installation operator was carried out within at least 5 minutes, as registered using the first module, and from the lack of response to an input request, as registered using the second module.

In accordance with an exemplary embodiment, a first characteristic number determined using the first module may contain errors since the installation operator perhaps has simply been sitting very still. However, a combination of a characteristic number from values determined using the first and second modules can be more significant since the installation operator has not fulfilled his duty to respond to a message (for example, because the operator has fallen asleep). An automatic return call or an email to a superior can then be carried out, as an action, by the activation module, for example, if the characteristic number exceeds/undershoots a threshold value.

The degree of attention or the degree of fatigue of the operator can be determined using the predefined physiological parameters. The recorded physiological parameters of the operator can include, for example, the eyelid blink frequency, the pulse, the blood pressure, the oxygen saturation, or the movement of the operator within a defined period of time. In accordance with an exemplary embodiment, the operator's posture can be determined using motion detection software which is integrated in the first module and cooperates with a camera and at least one motion sensor can also be recorded and analysed as a physiological parameter.

In accordance with an exemplary embodiment of the safety device according to the disclosure, the first module and the second module can interact with a processing and evaluation unit which determines a characteristic number for the degree of attention of the operator in an automated manner from the recorded values, compares this characteristic number with at least one predefined further characteristic value and triggers a further activation module if the further characteristic value is exceeded and/or undershot or if a predefined further range of characteristic values is left.

In an exemplary embodiment of the safety device, a signal generator can be provided as the triggering mechanism and triggers the activation module if the characteristic value is exceeded and/or undershot or if the predefined range of characteristic values is left.

In an exemplary embodiment, the checking mechanism can transmit a preset signal to the operator in an automated manner. The processing and evaluation unit can be provided with a value for further processing only after feedback from the operator to the transmitted signal, which value then triggers the activation module after being processed.

In an exemplary embodiment, motion detection software can be integrated in the second module, which software generates a signal or a pulse when no value for a predefined movement is registered by the first or second module over a predefined period of time. This pulse can be used, for example, to increase the airflow of an air-conditioning system, to reduce the temperature of the airflow and/or to request the operator to make a particular input.

The safety device according to the disclosure can be integrated in an operating and monitoring system of a safety-critical technical installation or a safety-critical technical process, for example, an oil and gas platform, a refinery or a power station installation.

Integrating the safety device according to the disclosure for monitoring the degree of attention of employees in the operating and monitoring system of the safety-critical installation or the safety-critical process can detect fatigue states and avoid resultant risks.

Exemplary methods disclosed herein can be based on the fact that the fatigue process and thus the degree of attention of the operator of a technical installation or a technical process can be detected in two stages, in which case only values, for example, provided by a cost-effective simple test which is only slightly perceived or is not perceived at all by the operator of the installation can be recorded in a first method section. In accordance with an exemplary embodiment, this test can have a high rate of false positive results (for example, fatigue was reported even though it is not present) and a low rate of false negative results (for example, fatigue was not reported even though it is present). In accordance with an exemplary embodiment, only when the first method section has been concluded with a predefined result is a second method section initiated with a more precise but also more complicated or more disruptive test with respect to the signs of fatigue of the operator, which test starts a triggering of actions.

The method according to the disclosure can be used to detect and evaluate the degree of attention of an operator of a technical installation or a technical process using a safety device. For example, a first module can be configured to provide values of predefined physiological parameters of the operator.

In accordance with an exemplary embodiment, a first characteristic number can be determined from the recorded values using the first module, the determined first characteristic number can be compared with a predefined characteristic value and, if the characteristic value is exceeded and/or undershot or if a predefined range of characteristic values is left, a second module can be activated, which second module interacts with the first module and can be used to record further values provided by a checking or triggering mechanism.

A second characteristic number for the degree of attention of the operator can be determined from the recorded further values in the second module, this second characteristic number can be compared with at least one second predefined characteristic value and, if the second characteristic value is exceeded and/or undershot or if a predefined second range of characteristic values is left, an activation module for taking countermeasures which increase the attention of the operator of the installation can be triggered.

In an exemplary embodiment of the method according to the disclosure, a characteristic number for the degree of attention of the operator can be determined in an automated manner from the recorded values using a processing and evaluation unit which interacts with the first module and the second module, said characteristic number can be compared with at least one predefined characteristic value and an activation module can be triggered if the characteristic value is exceeded and/or undershot or if a predefined range of characteristic values is left.

In an exemplary embodiment of the method according to the disclosure provides for a signal to be generated using motion detection software stored in the first module and/or in the second module if no movement of the operator has been registered over a predefined period of time and for the processing and evaluation unit to be provided with this signal in order to determine the characteristic number for the degree of attention of the operator.

In an exemplary embodiment of the method according to the disclosure, the values provided by the first module and the second module can be recorded or stored by the processing and evaluation unit and can be used to determine a long-term characteristic number which can be used, for example, to make a statement on the average number of signs of fatigue over a predefined period of time (for example 24 hours).

The statements provided in this manner can be used to improve existing operating and monitoring devices with respect to the operator's workplace design by virtue of the values of predefined physiological parameters, which can be generated in a simple and cost-effective manner using the first module, being combined with the values provided by the second module via a more precise checking or triggering mechanism and being used to determine a characteristic number for the degree of attention of the operator.

FIG. 1 shows an exemplary safety device 1 for detecting and evaluating the degree of attention of an operator of a technical installation using a passive module 11 which detects body reactions of an operator of the installation and uses them to generate values relating to the degree of attention of the operator and transmits said values to a processing and evaluation unit 13 (e.g., a processor).

The safety device according to the disclosure can also include a second active module 12 which records further values provided by a checking or triggering mechanism and transmits them to the processing and evaluation unit 13.

The processing and evaluation unit 13 which interacts with the first module 11 and the second module 12 can determine a characteristic number KPI for the degree of attention of the operator in an automated manner from the recorded values, compares the determined characteristic number KPI with at least one predefined characteristic value and triggers an activation module 15 if the characteristic value is exceeded and/or undershot or if a predefined range of characteristic values is left.

An example of a test which is carried out using the first module 11 can be based on monitoring, which is carried out in order to determine whether a person does not move over a long period of time, for example, this may mean that the person has fallen asleep or is concentrating very hard.

An example of a test which is carried out using the second module 12 can be based on a message or alarm, for example, "Please press the "ESC" button", which can be transmitted to the person. However, this message can be provided only if the value previously determined using the first module 11 indicates a justified suspicion that the installation operator has fallen asleep. In accordance with an exemplary embodiment, a lack of response by the installation operator can be an indication that the operator is a sleep, for example.

In accordance with an exemplary embodiment of a method according to the disclosure provides for a signal to be generated using motion detection software stored in the first module 11 and/or in the second module 12, if no movement of the operator has been registered over a predefined period of time and for the processing and evaluation unit 13 to be provided with this signal in order to determine the characteristic number for the degree of attention of the operator.

In accordance with an exemplary embodiment of the method according to the disclosure, the values provided by the first module 11 and the second module 12 can be recorded or stored by the processing and evaluation unit 13 and can be used to determine a long-term characteristic number which can be used, for example, to implement fatigue management and, for example, to make a statement on the average number of signs of fatigue over a predefined period of time (for example 24 hours).

The statements provided in this manner can be used to take countermeasures 14 in order to increase the attention of the operator of the installation. The countermeasures 14 can include, for example, the output of a signal tone, automatically informing a further person or reducing the airflow of an air-conditioning system or the temperature of the latter.

With the present disclosure, an inexpensive simple test which is only slightly perceived or is not perceived at all by the operator of the installation and is provided by the first module 11 can be combined with a further far more precise test with respect to the signs of fatigue of the operator, which test is provided by the second module 12.

In an exemplary embodiment, the test carried out by the first module 11 can be used to arouse suspicion, with the result that use of the test with the second module 12 is worthwhile or appropriate.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A safety device having a processor for detecting and evaluating the degree of attention of an operator of a technical installation or a technical process, the safety device comprising:
   a first module configured to:
      record values of predefined physiological parameters of the operator and determine a first characteristic number from the recorded values; and
      compare the determined first characteristic number with a predefined first characteristic value and, if the first characteristic value is exceeded and/or undershot or if a predefined first range of characteristic values is left, activates a second module; and
   wherein the second module is configured to:
      record further values provided by a checking or triggering mechanism;
      determine a second characteristic number for the degree of attention of the operator from the recorded further values;
      compare the second characteristic number with at least one second predefined characteristic value and, if the second characteristic value is exceeded and/or undershot or if a predefined second range of characteristic values is left; and
      request an action from the operator, and if the operator does not respond to the request, triggers an activation module for taking countermeasures which increases the attention of the operator of the installation, the countermeasures including automatically informing a further person of the operator's failure to respond to the request.

2. The safety device according to claim 1, comprising:
   a processing and evaluation unit configured to:
      interact with the first and second modules;
      determine a further characteristic number for the degree of attention of the operator in an automated manner from the recorded values;
      compare the further characteristic number with at least one predefined further characteristic value; and trigger a further activation module if the further characteristic value is exceeded and/or undershot or if a predefined further range of characteristic values is left.

3. The safety device according to claim 1, comprising:
a signal generator, which is provided as the triggering mechanism.

4. The safety device according to claim 1, wherein the checking or triggering mechanism is configured to transmit a preset signal to the operator in an automated manner, the operator providing the processing and evaluation unit with a value only after feedback from the operator to the transmitted signal.

5. The safety device according to claim 1, wherein the degree of attention or the degree of fatigue of the operator is determined using the predefined physiological parameters.

6. The safety device according to claim 1, wherein the first module is configured to detect body reactions of the operator.

7. The safety device according to claim 1, comprising:
at least one sensor configured to detect body reactions of the operator.

8. The safety device according to claim 1, wherein the safety device is integrated in an operating and monitoring system.

9. The safety device according to claim 1, wherein the operating and monitoring system is a safety-critical technical installation or a safety-critical technical process.

10. The safety device according to claim 9, wherein the technical installation or technical process is an oil and gas platform, a refinery, or a power station installation.

11. A method for a technical installation or a technical process using a device for detecting and evaluating the degree of attention of an operator of the installation or the process, the method comprising:
recording values of predefined physiological parameters of the operator using a first module;
determining a first characteristic number from the recorded values;
comparing the determined first characteristic number with a predefined first characteristic value and, if the first characteristic value is exceeded and/or undershot or if a predefined first range of characteristic values is left, activating a second module to record further values provided by a checking or triggering mechanism;
determining a second characteristic number for the degree of attention of the operator from the recorded further values using the second module; and
comparing the second characteristic number with at least one second predefined characteristic value and, if the second characteristic value is exceeded and/or undershot or if a predefined second range of characteristic values is left, requesting an action from the operator and if the operator does not respond to the request, triggering an activation module for taking countermeasures which increase the attention of the operator of the installation, the countermeasures including automatically informing a further person of the operator's failure to respond to the request.

12. The method according to claim 11, comprising:
determining a characteristic number for the degree of attention of the operator in an automated manner from the recorded values using a processing and evaluation unit which is configured to interact with the first module and the second module;
comparing the characteristic number with at least one predefined characteristic value; and
triggering a further activation module if the characteristic value is exceeded and/or undershot, or if a predefined range of characteristic values is left.

13. The method according to claim 12, comprising:
recording the values by the first module and the second module on the processing and evaluation unit; and
determining a long-term characteristic number using the recorded values to make a statement on the average number of signs of fatigue over a predefined period of time.

14. The method according to claim 11, comprising:
generating a signal using motion detection software stored in the first module and/or in the second module if no movement of the operator has been registered over a predefined period of time.

15. The method according to claim 13, comprising:
generating a signal using motion detection software stored in the first module and/or in the second module if no movement of the operator has been registered over a predefined period of time.

16. The method according to claim 11, comprising:
determining the degree of attention or the degree of fatigue of the operator using the predefined physiological parameters.

17. The method according to claim 11, comprising:
detecting body reactions of the operator with the first module.

18. The method according to claim 11, comprising:
detecting body reactions of the operator using at least one sensor.

19. The method according to claim 11, comprising:
integrating the safety device in an operating and monitoring system.

20. The safety device according to claim 1, wherein the action from the operator is pressing a button.

* * * * *